Sept. 28, 1965 — T. O. MATHUES ETAL — 3,208,290
BALL JOINT PURGEABLE SEAL MEANS
Filed Oct. 22, 1962
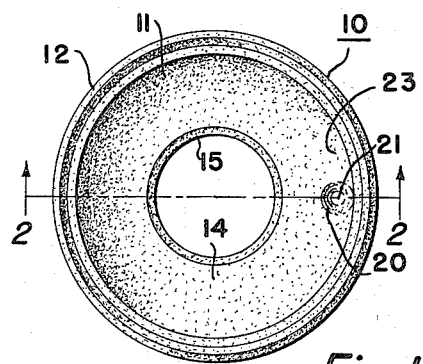
Fig. 1
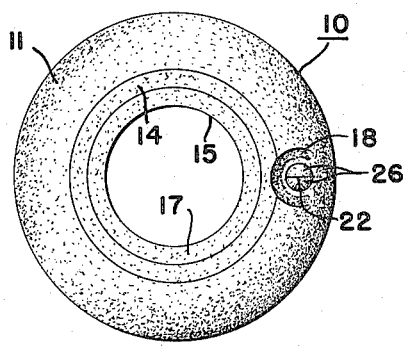
Fig. 3
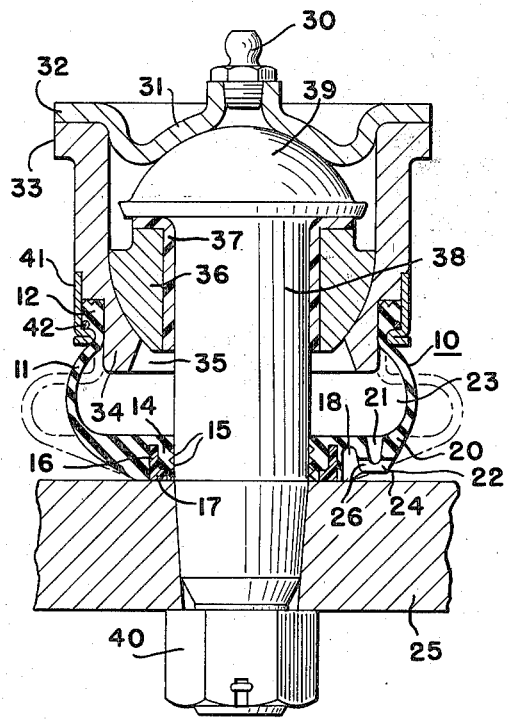
Fig. 2
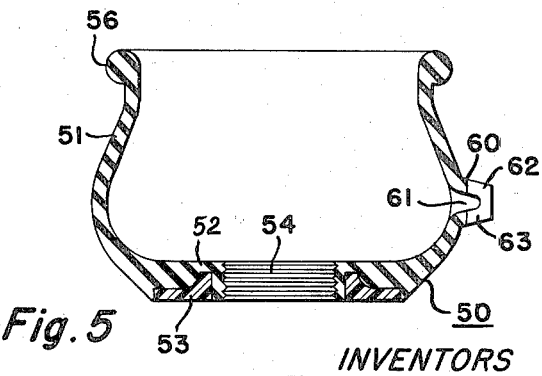
Fig. 4
Fig. 5
INVENTORS
Thomas O. Mathues
Vernon L. Pickering
Leo S. Sullivan, Jr.
BY
Their Attorney United States Patent Office 3,208,290
Patented Sept. 28, 1965

3,208,290
BALL JOINT PURGEABLE SEAL MEANS
Thomas O. Mathues, Vernon L. Pickering, and Leo S. Sullivan, Jr., Dayton, Ohio, assignors to General Motors Corporation, Detroit, Mich., a corporation of Delaware
Filed Oct. 22, 1962, Ser. No. 232,158
2 Claims. (Cl. 74—18.1)

This invention relates to means to permit passage of lubricant relative to a ball joint assembly, and more particularly, to a combination dirt-shielding resilient boot and one-way valve means integral therewith.

An object of this invention is to provide a new and improved combination dirt-shielding resilient boot and one-way valve means integral therewith.

Another object of this invention is to provide a ball joint assembly having complementary socket and ball portions from which stud means project to be relatively movable, though attached to a structural member such as a vehicle steering knuckle against which a combination dirt-shielding resilient boot having an integral one-way valve means therewith can effect a lubricant seal subject to temporary purging of the seal under pressurized supply of lubricant which flexes apart a finely slit extension projecting integrally therefrom.

Another object of this invention is to provide a combination dirt-shielding boot and one-way valve means for installation on a ball joint assembly having complementary socket and ball portions from which stud means project to be radially surrounded by a flexible and annular outwardly-bowed body portion having an integral projection on a side wall thereof located radially away from the stud means and apertured inwardly on the projection to provide a seal means purgeable temporarily permitting passage of pressurized ball joint lubricant therethrough which is otherwise sealingly retained by the body portion having opposite sealing edges engaging the socket and stud means respectively.

A further object of this invention is to provide a combination dirt-shielding and one-way valve means for installation on a ball joint assembly having complementary socket and ball portions from which stud means project to be radially surrounded by a flexible angular body portion extending continuously between the socket and stud means sealingly engaged by a reduced-diameter inwardly-serrated edging which is recessed outwardly to one side thereof in a location where an integral projection having a passage therethrough extends longitudinally of a central axis of the annular body portion as a purgeable valve means to permit passage of pressurized lubricant supplied to the ball joint assembly by way of a lubricant fitting through normally sealingly retained by the flexible annular body portion.

Another object of this invention is to provide a combination dirt-shielding boot and one-way valve means for installations and a ball joint assembly having complementary socket and ball portions from which stud means project to be radially surrounded by a flexible annular body portion extending continuously between the socket and stud means sealingly engaged by a reduced-diameter inwardly-serrated edging having a reinforcing annular plastic member of L-shaped cross section embedded therein to enhance wear resistance and rigidity in a low flexing area laterally adjacent to which there is a radial recessing where an integral projection extends longitudinally and axially from the resilient annular body portion as a purgeable valve means to permit restricted passage or pressurized lubricant supplied to the ball joint assembly by way of a lubricant fitting though normally sealingly retained by the flexible annular body portion.

Further objects and advantages of the present invention will be apparent from the following description, reference being had to the accompanying drawings wherein a preferred embodiment of the present invention is clearly shown.

In the drawings:

FIGURE 1 is a plan view of a combination dirt-shielding boot and one-way purgeable valve means in accordance with the present invention.

FIGURE 2 is a cross-sectional view taken along line 2—2 in FIGURE 1 and indicating installation with a ball joint assembly.

FIGURE 3 is a bottom view of the combination dirt-shielding boot and one-way purgeable valve means of FIGURES 1 and 2.

FIGURE 4 is a plan view of another embodiment of combination dirt-shielding boot and one-way purgeable valve means in accordance with the present invention.

FIGURE 5 is a cross-sectional view taken along line 5—5 in FIGURE 4.

Increased use of extended lubrication schedules recommended by vehicle manufacturers results in need for thorough lubrication and preventive maintenance when necessary. Application of lubricants under pressure to fittings of vehicle suspension components can be facilitated by provision of a combination dirt-shielding resilient boot and one-way valve means integral therewith in accordance with the present invention. When supplying lubricant under pressure to a fitting, it is usual for an ample supply of new lubricant to be added resulting in a displacement of used and dirty lubricant previously in such a suspension component. However, quite often it is difficult to effect displacement of such used and dirty lubricant and such dispersal thereof can hinder injection of new lubricant under pressure. Accordingly, a combination dirt-shielding resilient boot and one-way valve means generally indicated by numeral 10 in FIGURE 10 can be provided for installation on a ball joint assembly as indicated in FIGURE 2.

The combination dirt-shielding resilient boot and one-way purgeable valve means integral therewith includes a resilient annular body portion 11 as can be best seen in views of FIGURES 2 and 3. Integral with this flexible annular body portion 11 there can be opposite sealing edges including an outwardly extending annular flange or edging 12 as well as a reduced-diameter inwardly-extending edging 14 provided with integral inwardly-projecting serrations 15. Embedded in the reduced-diameter edging 14 there can be an annular reinforcing plastic member 16 of L-shaped cross section having a lower edge thereof extending radially inwardly toward the serrations 15 so as to provide a bottom surfacing 17 to enhance wear resistance and to maintain sealing lip pressure. This reinforcing annular plastic member 16 can be made of a suitable moldable material such as polyamide or "nylon" as well as acetal or "Delrin." It is also possible for a low-friction fluorine-containing material such as polytetrafluoroethylene or "Teflon" to be used for the reinforcing annular plastic member 16. The edging 14 with the plastic member 16 embedded therein has a predetermined rigidity so as to be a low-flexing area laterally adjacent to which there is a crescent-shaped radial recessing 18 as indicated in views of FIGURES 2 and 3 where an integral projection or extension 20 extends longitudinally and axially from the resilient annular body portion 11. A passage 21 and a diametrically transverse slit or cut 22 which can be purged or caused to separate temporarily into a restrictive opening or aperturing through which used lubricant can be caused to pass from an interior space 23 within confines of the annular body portion 11 to a location 24 in space to one side of a structural mounting member 25 such as a vehicle steering knuckle and the like is indicated in FIGURE 2. The cut or slit 22 is located between the pair of semi-annular sealing lip portions 26 that can be seen in views of FIGURES 2 and 3.

Installation of the combination dirt-shielding boot and one-way purgeable valve means 10 on a ball joint assembly is indicated in FIGURE 2. The ball joint assembly can include a lubricant fitting 30 carried centrally relative to a metal cover portion 31 having an outer peripheral edging 32 attached to one end of an annular housing or socket portion 33 provided with a reduced diameter mounting flange 34 and a central opening 35 adjacent to an opposite end thereof. A sintered metal annular bearing means 36 surrounding a sleeve-like low-friction plastic member 37 can be provided between an inner periphery of the socket portion 33 and a stud means 38. A semispherical or curved head portion 39 is carried by this stud means 38 and is engageable against a complementary curved dome-like center of the cover portion 31. A free end of the stud means 38 can have a tapered outer periphery engageable with a mounting hole of the structural member 25 such that a threaded end of the stud means is engageable by a fastener such as a nut 40.

The inner bearing portion or liner member 37 can have an L-shaped cross section and can be axially fitted around a stud means 38 such that an integral outwardly extending flange of the member 37 abuts against a shoulder formed along an under side of the curved head 39. This liner or member 37 can be made of a low-friction plastic bearing material such as "Delrin" acetal resin and the like. Such acetal resin in this sleeve-like bearing member 37 assures high dimensional stability, tensile and flexural strength, resilience and toughness under a wide range of service conditions including temperature, humidity, solvents and stress. Such a "Delrin" sleeve-like liner or bearing member 37 provides for easier turning between the ball-stud and socket in a ball joint assembly relative to the annular sintered metal bearing portion 36 that engages a curved inner periphery of the socket body portion 11. Reference can be made to a copending patent application S.N. 42,909, Baker, filed July 14, 1960, now Patent 3,091,486, Baker, issued May 28, 1963 and belonging to the assignee of the present invention wherein a differing bearing structure is disclosed with a head and stud means similar to that indicated in FIGURE 2. It is to be understood that the specific arrangement of the head and stud with such a bearing means can be varied though a lubricating fitting 30 can be secured centrally to the cover portion 31. In any event, the combination dirt-shielding resilient boot and one-way valve means integral therewith can be mounted to extend continuously between the socket portion 33 and the structural member 25 subject to central flexing or intermediate displacement of the annular body portion 11 as indicated in FIGURE 2. A metal band 41 as well as a wire-like spring retainer 42 can be provided to anchor the flange end 12 of the annular body portion 11 securely to the reduced-diameter flange 34 of the socket 33. It is apparent from the illustration of FIGURE 2 that the extension or projection 20 is located in a low flexing area substantially parallel to a central axis of the annular body portion 11 of resilient or elastomeric material that can bulge laterally outwardly along intermediate locations though lubricant under pressure can be caused to escape through the passage 21 and cut or slit 22 during temporary separation of the sealing lips 26 from each other and subsequent closure of the sealing lips to prevent entry of foreign material into the passage 21 by way of the cut or slit 22.

Another embodiment of a combination dirt-shielding boot and one-way valve means generally indicated by numeral 50 can be seen in FIGURE 4. This combination dirt-shielding boot and one-way valve means includes an outwardly bowed flexible and resilient annular body portion 51 provided with a reduced-diameter sealing edge 52 including an annular reinforcing member 53 of L-shaped cross-section embedded therein to enhance surface wear resistance and to maintain sealing lip pressure as well as having serrations 54 extending radially inwardly and integrally therewith to be engageable peripherally around a stud means such as indicated by numeral 38 in FIGURE 2. A larger diameter flange portion 56 can be provided integrally with the resilient annular body portion 51 at a location remote from the reduced diameter sealing edge 53. The flange portion 56 is adapted to fit complementary to a ball joint socket or housing portion similar to that indicated by numeral 33 in FIGURE 2. A purgeable valve means is provided integrally with the outwardly bowed annular body portion 51 and includes a laterally and radially outwardly extending projection 60 having a central passage 61 and a cut or slit 62 diametrically therethrough as can be best seen in FIGURE 5. It is to be understood that the outwardly bowed annular body portion 51 can be subject to considerable flexing due to movement of a stud means carrying a ball or curved head portion retained in a socket. The projection or extension 60 is located radially away from the stud means as the body portion 51 is oriented axially and outwardly from the stud means of such a ball joint assembly. Integrally with the projection 60 there can be a pair of sealing lip portions 63 on opposite sides of the cut or slit 62 such that the annular body portion 51 is provided with a sealing one-way valve means purgeable temporarily to permit passage of pressurized ball joint lubricant therethrough which is otherwise sealingly retained by the body portion having opposite sealing edges engaging the socket and stud means respectively. The sealing lips 63 temporarily flex apart along the slit 62 to facilitate escape of lubricant under pressure from the ball joint assembly.

While the embodiments of the present invention constitute a preferred form, it is to be understood that other forms might be adopted.

What is claimed is as follows:

1. On a ball joint assembly having a socket portion and a ball portion complementary thereto with a stud means of the ball portion being secured to a structural support and with a lubricant fitting carried by the socket portion, the improvement which comprises a specific combination one-way valve means and dirt-shielding resilient boot having an outwardly bowed continuous annular body portion subject to considerable flexing due to movement of the stud means with the ball portion retained by the socket portion, said outwardly bowed continuous annular body portion having an integral outwardly extending annular flange secured to the socket portion and an integral reduced-diameter inwardly-extending annular edging adjacent to the stud means and structural support, both said annular flange and said annular edging having less deformation as well as a minimum of flexing compared with considerable flexing of said outwardly bowed continuous annular body portion of said dirt-shielding boot, a substantially crescent-shaped lateral recessing provided only radially outwardly in a low flex area of said integral reduced-diameter inwardly extending annular edging away from as well as radially inwardly of said outwardly bowed continuous annular body portion only per se subject to considerable flexing, and an integral projection on said boot in a location of low flexing surrounded by said crescent-shaped recessing and extending longitudinally substantially parallel to said stud means as well as specifically longitudinaly of said continuous annular body portion, said projection having a diametrically cut transverse slit in a location away from said outwardly bowed continuous annular body portion and remote from said outwardly extending annular flange secured to the socket portion, said transverse slit being protectively in intermediate position both due to longitudinal location for one-way restrictive passage of pressurized lubricant independent of considerable flexing of said outwardly bowed continuous annular body portion and due to location within confines of said crescent-shaped recessing in the low flex area.

2. On a dirt-shielding resilient booth specifically in a ball joint assembly having a socket portion and a ball portion complementary thereto with a stud means of the ball portion being secured to a structural support and with a lubricant fitting carried by the socket portion, the resilient boot having an outwardly bowed continuous annular body portion subject to considerable flexing due to movement of the stud means with the ball portion retained by the socket portion to which one end of the resilient boot is secured and an opposite integral reduced-diameter inwardly-extending annular plastic-reinforced edging that engages said stud means, the combination therewith which comprises an integrally extended projection having a passage centrally thereof specifically in a low flex area of the reduced-diameter edging in a lateral location to be shielded by the body portion of the boot, a substantially curved lateral recessing located only in the low flex edging around said projection and radially outwardly along the plastic-reinforced edging, both said recessing and said projection with the passage thereof being located substantially longitudinally of the boot though radially inwardly of the outwardly bowed continuous annular body portion, and a pair of sealing lip portions defining a diametrically transverse slit radially outwardly though axially in alignment with said projection passage subject to only one-way escape of pressurized lubricant outwardly therethrough as a one-way valve means protected in directions located both laterally outwardly thereof due to axial positioning inwardly from the bowed body portion and laterally inwardly thereof due to axial positioning outwardly from the plastic-reinforced edging having said curved recessing though entirely in a low flex area adjacent to the stud means and structural support.

References Cited by the Examiner
UNITED STATES PATENTS

| | | | |
|---|---|---|---|
| 2,644,663 | 7/53 | Klingler | 137—525.1 |
| 2,921,809 | 1/60 | Kogstrom. | |
| 2,936,188 | 5/60 | Moscovitz | 287—900 |
| 3,041,885 | 7/62 | Christiansen. | |

FOREIGN PATENTS 1,265,007   5/61   France.

BROUGHTON G. DURHAM, *Primary Examiner.*
SAMUEL ROTHBERG, *Examiner.*